United States Patent
Kutaragi et al.

(10) Patent No.: US 9,135,752 B2
(45) Date of Patent: Sep. 15, 2015

(54) IMAGE DISPLAY SYSTEM

(75) Inventors: Ken Kutaragi, Tokyo (JP); Takashi Usuki, Tokyo (JP); Yasuhiko Yokote, Tokyo (JP)

(73) Assignee: CYBER AI ENTERTAINMENT INC., Tokyo (JP)

( * ) Notice: Subject to any disclaimer, the term of this patent is extended or adjusted under 35 U.S.C. 154(b) by 252 days.

(21) Appl. No.: 13/519,461

(22) PCT Filed: Dec. 28, 2010

(86) PCT No.: PCT/JP2010/073744
§ 371 (c)(1),
(2), (4) Date: Jun. 27, 2012

(87) PCT Pub. No.: WO2011/081193
PCT Pub. Date: Jul. 7, 2011

(65) Prior Publication Data
US 2012/0281913 A1      Nov. 8, 2012

(30) Foreign Application Priority Data

Dec. 28, 2009  (JP) ................................. 2009-297907

(51) Int. Cl.
*G06K 9/00* (2006.01)
*G06T 19/00* (2011.01)
*G06F 17/30* (2006.01)

(52) U.S. Cl.
CPC ........ *G06T 19/006* (2013.01); *G06F 17/30247* (2013.01); *G06K 9/00671* (2013.01)

(58) Field of Classification Search
None
See application file for complete search history.

(56) References Cited

U.S. PATENT DOCUMENTS

| | | | |
|---|---|---|---|
| 6,295,066 B1 | 9/2001 | Tanizaki et al. | |
| 6,504,957 B2 * | 1/2003 | Nguyen et al. | 382/209 |
| 7,158,878 B2 | 1/2007 | Rasmussen et al. | |
| 7,209,148 B2 | 4/2007 | Rasmussen et al. | |
| 7,379,811 B2 | 5/2008 | Rasmussen et al. | |
| 7,570,828 B2 | 8/2009 | Rasmussen et al. | |

(Continued)

FOREIGN PATENT DOCUMENTS

| | | |
|---|---|---|
| JE | 2007019671 A | 1/2007 |
| JP | 2002-074399 A | 3/2002 |

(Continued)

OTHER PUBLICATIONS

Extended European Search Report, dated Sep. 10, 2013, for European Application No. 10841048.1—1952/2521096, 9 pages.

(Continued)

*Primary Examiner* — Chan Park
*Assistant Examiner* — Eueng-Nan Yeh
(74) *Attorney, Agent, or Firm* — Seed IP Law Group PLLC

(57) ABSTRACT

Provided is an image display system which allows a user to browse an object of interest in a background as if she/he picks up and moves the object of interest by hand, and allows the user to visually enter inside a specified object placed on the background. The image display system of the present invention is characterized in that it has a mother database (MDB) reconfigured from a database for configuring an object, wherein an image (a two-dimensional image, a three-dimensional space or a four-dimensional space) based on the MDB, in an entire image, is substituted for an object subjected to the object recognition based on the MDB, and synthetically displayed.

13 Claims, 8 Drawing Sheets

(56) References Cited

U.S. PATENT DOCUMENTS

| | | | |
|---|---|---|---|
| 7,599,790 | B2 | 10/2009 | Rasmussen et al. |
| 7,620,496 | B2 | 11/2009 | Rasmussen |
| 7,831,387 | B2 | 11/2010 | Golding et al. |
| 7,865,301 | B2 | 1/2011 | Rasmussen et al. |
| 7,894,984 | B2 | 2/2011 | Rasmussen et al. |
| 7,920,698 | B1 | 4/2011 | Mikan et al. |
| 7,920,968 | B2 | 4/2011 | Chapin et al. |
| 7,962,281 | B2 | 6/2011 | Rasmussen et al. |
| 8,005,613 | B2 | 8/2011 | Rasmussen et al. |
| 8,014,946 | B2 | 9/2011 | Rasmussen et al. |
| 2002/0049084 | A1* | 4/2002 | Hughs-Baird et al. ......... 463/20 |
| 2005/0151843 | A1* | 7/2005 | Ozaki et al. .................. 348/143 |
| 2005/0166163 | A1* | 7/2005 | Chang et al. ................. 715/863 |
| 2006/0036577 | A1 | 2/2006 | Knighton et al. |
| 2007/0112747 | A1* | 5/2007 | Haigh et al. ..................... 707/4 |
| 2007/0179918 | A1 | 8/2007 | Heisele et al. |
| 2008/0291205 | A1 | 11/2008 | Rasmussen et al. |
| 2009/0052787 | A1 | 2/2009 | Satoh |
| 2011/0145232 | A1 | 6/2011 | Chang et al. |
| 2012/0075337 | A1 | 3/2012 | Rasmussen et al. |

FOREIGN PATENT DOCUMENTS

| | | |
|---|---|---|
| JP | 2003-067429 A | 3/2003 |
| JP | 2006-202323 A | 8/2006 |
| JP | 2007188310 A | 7/2007 |
| JP | 2007-531004 A | 11/2007 |
| WO | 2009/155281 A | 12/2009 |

OTHER PUBLICATIONS

International Search Report, mailed Feb. 1, 2011, for PCT/JP2010/073744, 2 pages.

Written Opinion, mailed Feb. 1, 2011, for PCT/JP2010/073744, 6 pages.

Csurka et al., "Visual Categorization with Bags of Keypoints," Proc. ECCV Workshop on Statistical Learning in Computer Vision, 16 pages, 2004. (The year of publication is sufficiently earlier than the effective U.S. filing date and any foreign priority date so that the particular month of publication is not in issue.).

Duygulu et al., "Object Recognition as Machine Translation: Learning a Lexicon for a Fixed Image Vocabulary," European Conference on Computer Vision (ECCV), 15 pages, 2002. (The year of publication is sufficiently earlier than the effective U.S. filing date and any foreign priority date so that the particular month of publication is not in issue.).

Fergus et al., "Object Class Recognition by Unsupervised Scale-Invariant Learning," IEEE Conf. on Computer Vision and Pattern Recognition, 8 pages, 2003. (The year of publication is sufficiently earlier than the effective U.S. filing date and any foreign priority date so that the particular month of publication is not in issue.).

Kakumoto et al., "Integrated Geographic Database and Common GIS for Local Government for Realizing Risk-Adaptive Regional Management Information System," Papers and Proceedings of the Geographic Information Systems Association 8:179-184, 1999. (The year of publication is sufficiently earlier than the effective U.S. filing date and any foreign priority date so that the particular month of publication is not in issue.).

Lowe, "Object Recognition from Local Scale-Invariant Features," Proc. IEEE International Conf. on Computer Vision, 8 pages, 1999. (The year of publication is sufficiently earlier than the effective U.S. filing date and any foreign priority date so that the particular month of publication is not in issue.).

Sivic et al., "Video Google: A Text Retrieval Approach to Object Matching in Videos," Proc. ICCV vol. 2, 8 pages, 2003. (The year of publication is sufficiently earlier than the effective U.S. filing date and any foreign priority date so that the particular month of publication is not in issue.).

Yanai, "The Current State and Future Directions on Generic Object Recognition," Journal of Information Processing Society of Japan 48(SIG16), 15 pages, 2007. (The year of publication is sufficiently earlier than the effective U.S. filing date and any foreign priority date so that the particular month of publication is not in issue.).

* cited by examiner

FIG. 5
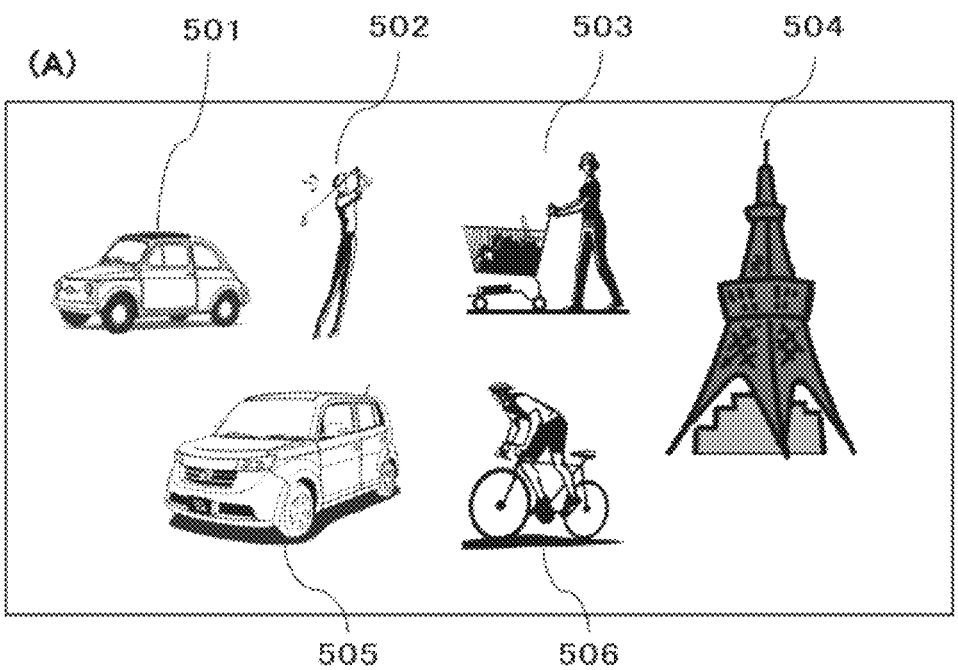
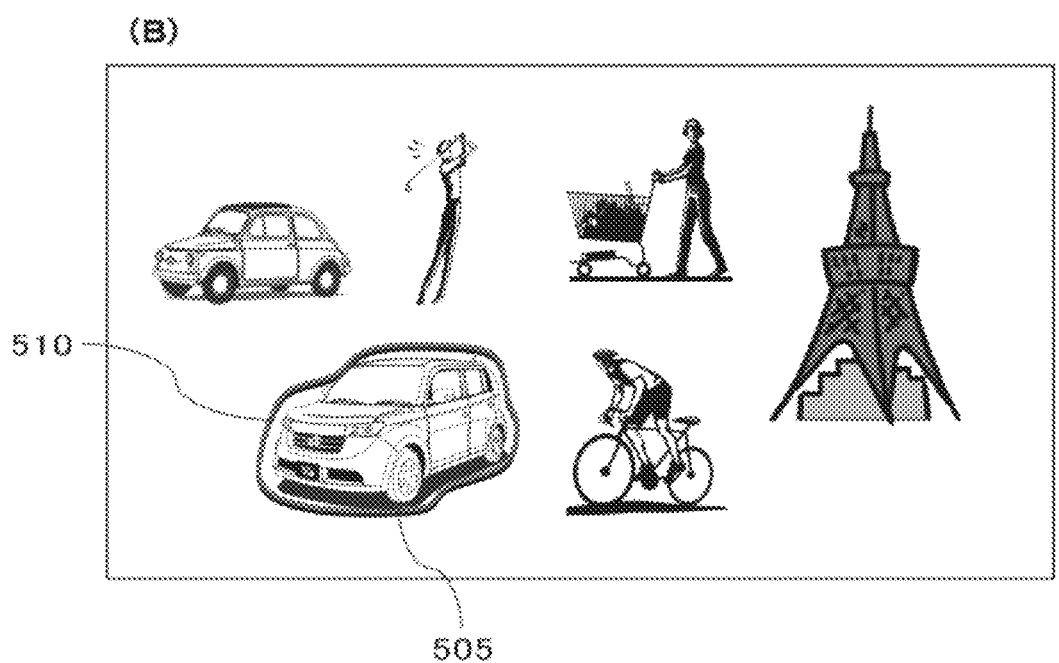

AFTER IDENTIFYING AUTOMOBILE 505, MOVING INTO INSIDE (PASSENGER COMPARTMENT)

FIG. 7
(A)
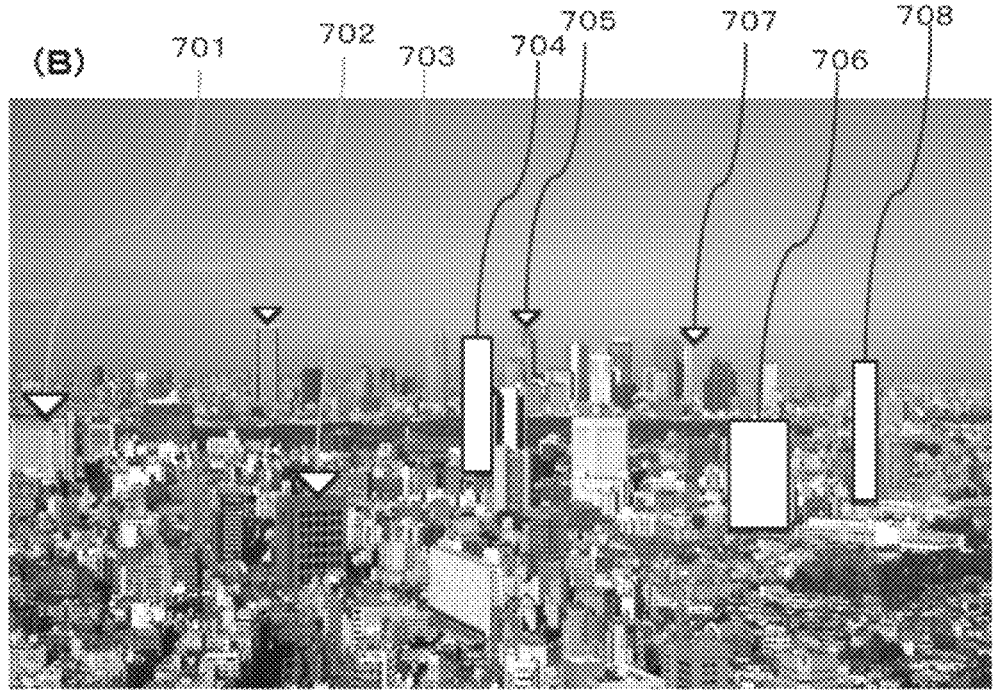
(B)

FIG. 8
(A)
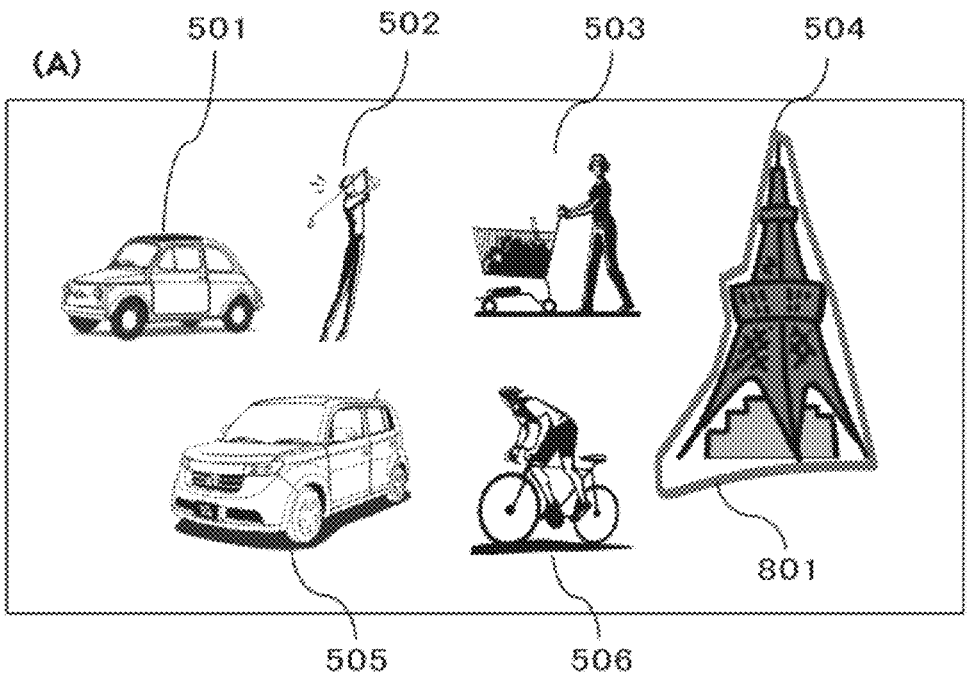
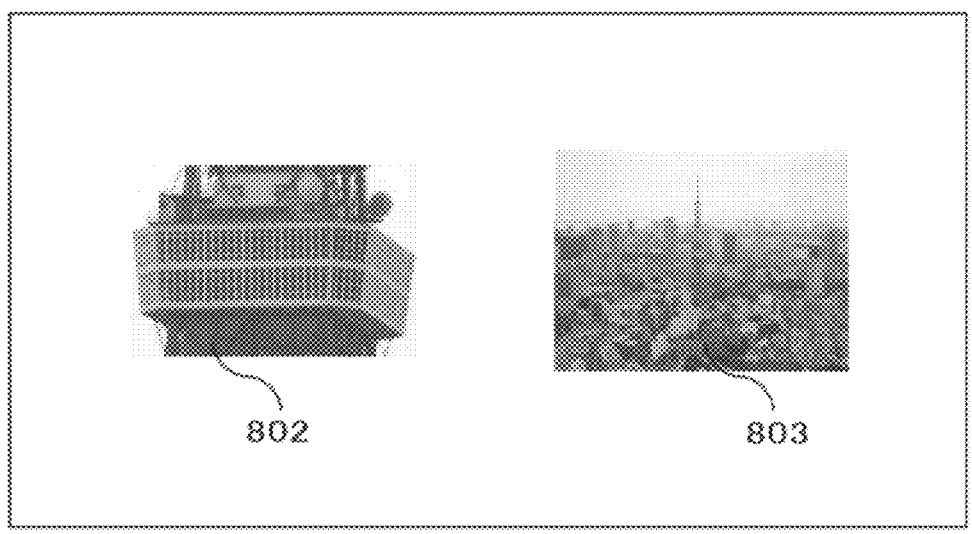

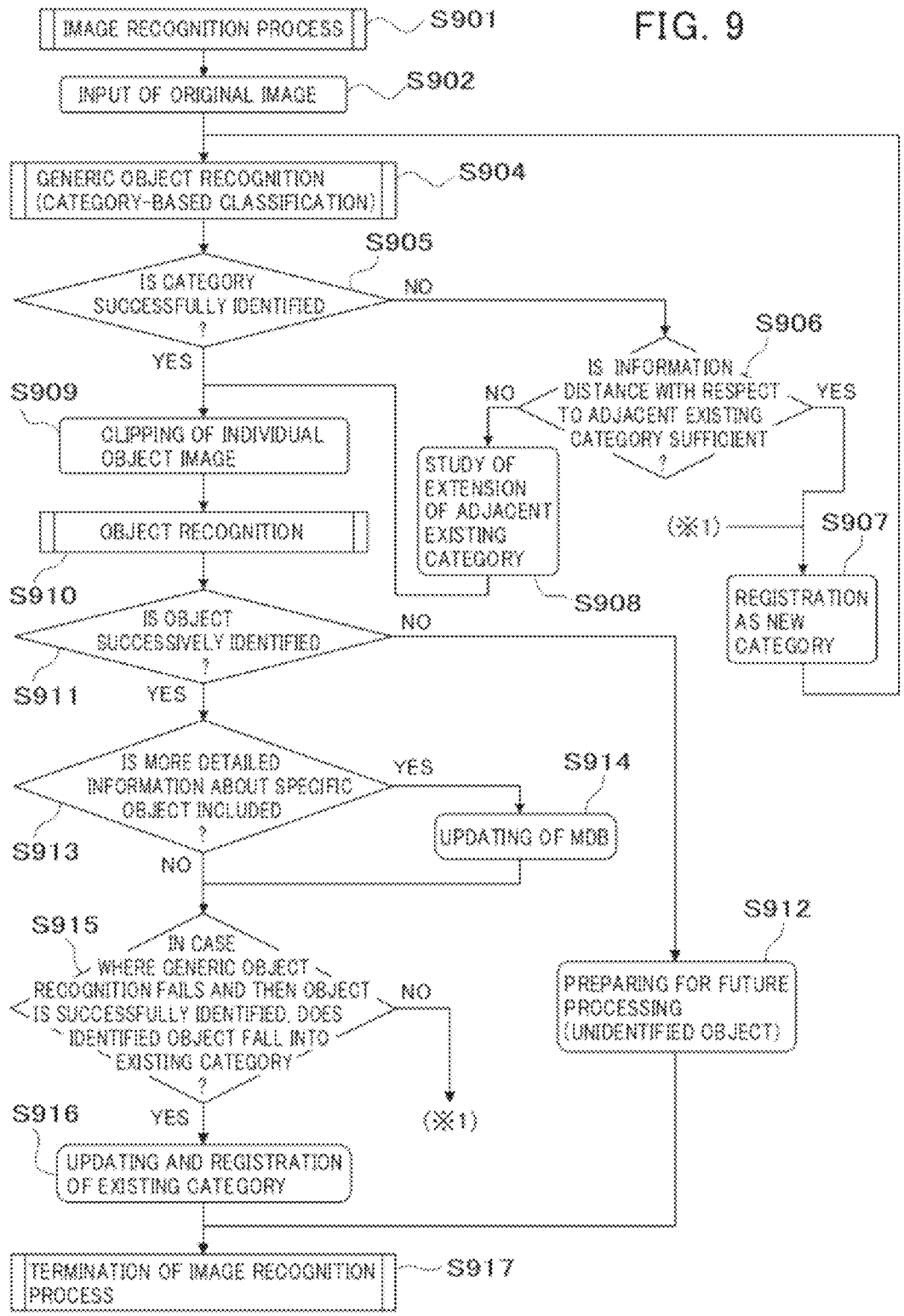

IMAGE DISPLAY SYSTEM

CROSS-REFERENCE TO RELATED APPLICATION

This application is a U.S. national stage application filed under 35 U.S.C. §371 of International Patent Application PCT/JP2010/073744, accorded an international filing date of Dec. 28, 2010, which is incorporated herein by reference in its entirety.

TECHNICAL FIELD

The present invention relates generally to an image display system, and more particularly to an image display system comprising a database and having an image recognition function.

BACKGROUND ART

Along with enhancement in processing ability of a server device and a terminal device such as a personal computer, a PDA or a mobile phone, and progress in computer networks and the Internet environments, a way for providing visual information such as moving image or still image becomes more diversified. For example, in the Internet, a concept of linking evolves, wherein, through an operation of clicking a text or image arranged on a Web page in a linkable manner, it is possible to transfer to another related Web page and download a related file. When a link destination is an audio file or a moving image file, it can be reproduced in real time (e.g., streaming playback) according to need.

Recent years, map information providing services for providing information about a geographical position is becoming more advanced. For example, there is a map information providing service disclosed in the following Patent Document 1. This service is based on an apparatus for use in displaying a digital map. The apparatus comprises: means for creating a set of map tiles relating to a map prepared from digital map data; means for interpreting candidate location data received from a client, wherein the candidate location data includes location information; means for determining the location information from the candidate location data; and means for providing, to the client, a requested map tile relating to the location information.

In 2005, the applicant of the Patent Document 1 started to provide a virtual glove Web service, so-called "Google Earth" (in Japan, http://earth.google.co.jp/). This service is intended to synthesize, on a server, a photographic image from a satellite around the earth, and provide the synthesized image to a user, wherein a user accessed from a terminal device can view satellite images around the world as if she/he looks a globe while rotating it. In an area where high-resolution images are available, it is possible to descend (zoom in) to an altitude of several meters, which allows a user to have an experience something that she/he browses aerial photographs. In 2007, Google Inc. also started a Web service, so-called "Google Street View" (in Japan, http://www.google.co.jp/help/maps/streetview/). This service is intended to synthesize, on a server, a 360-degree panoramic image collected by running, around a town, a large number of automobiles each having a camera mounted on a roof thereof, and provide the synthesize image to a user. A user accessed from a terminal device can move along a street back and forth and around, with the panoramic image, and have a simulated experience as if she/he drives an automobile around a town. The user can change the field of view from right to left or up and down, and can zoom in and zoom out. The "Google Street View" is configured to cooperate with the "Google Map" and "Google Earth" early provided by Google Inc.

Meanwhile, a research theme actively conducted along with progress in computer technologies includes an image recognition technology. Research on image recognition using a computer was started in 1960s. Since then, along with progress of high-speed processing technologies for computers and machine learning technologies, researches on line-drawing interpretation (1970s), a cognitive model based on a knowledge database constructed using a manually formulated rule and/or geometric model, and a three-dimensional model representation (1980s) were promoted. In the 1990s, researches, particularly, on facial image recognition and learning-based recognition, became active.

Researches on image recognition evolved from facial image recognition into generic object recognition. In the 2000s, further enhanced computer abilities made it possible to handle an enormous amount of calculation required for statistical processing and learning processing, and thereby researches on generic object recognition were promoted. The term "generic object recognition" means a technology of causing a computer to recognize, as a generic name, an object included in an image acquired from a real-world scene. In the '80s, the formulation of rules and models was manually performed, whereas, in the 2000s where it became possible to process a great deal of data at high speed, great interest was shown in an approach based on statistical machine learning, which triggered the recent boom of generic object recognition. The generic object recognition technology makes it possible to automatically assign a keyword to an image, and classify and retrieve the image in accordance with its semantic. An ultimate goal is to realize a human's cognitive function by a computer (Non-Patent Publication 1).

The generic object recognition technology progressed by approach from an image database and introduction of a statistical probability method. A pioneering research during the progress includes a method of leaning a correlation from data created by manually assigning keywords to an image to perform object recognition (Non-Patent Publication 2), and a method based on local feature values (Non-Patent Publication 3). Further, a research on generic object recognition based on local feature values includes the SIFT (Scale-Invariant Feature Transform) method (Non-Patent Publication 4), and the Video Google (Non-Patent Publication 5).

In 2004, so-called "Bag-of-Keypoints" or "Bag-of-Features" method was proposed. This method is intended to express an image by a histogram representing the frequency of appearance of a typical local pattern image piece, so-called "visual word". More specifically, a histogram is created for each image by extracting feature points based on the SIFT method, and vector-quantizing an SIFT feature vector based on a plurality of pre-obtained visual words. The histogram created in this manner is formed as sparse vectors, such as several hundred to several thousand-dimensional vectors. Then, image recognition process is performed by handling these vectors as a classification problem of multidimensional vectors (Non-Patent Publication 6).

LIST OF PRIOR ART DOCUMENTS

Patent Documents

Patent Document 1: JP 2007-531004A

Non-Patent Documents

Non-Patent Publication 1: Keji YANAI, "The Current State and Future Directions on Generic Object Recognition", Journal of Information Processing Society of Japan, Vol. 48, No. SIG16 (CVIM19), pp. 1-24, 2007

Non-Patent Publication 2: Pinar Duygulu, Kobus Barnard, Nando de Freitas, David Forsyth, "Object Recognition as Machine Translation: Learning a lexicon for a fixed image vocabulary," European Conference on Computer Vision (ECCV), pp. 97-112, 2002

Non-Patent Publication 3: R. Fergus, P. Perona, and A. Zisserman, "Object Class Recognition by Unsupervised Scale-invariant Learning," IEEE Conf. on Computer Vision and Pattern Recognition, pp. 264-271, 2003

Non-Patent Publication 4: David G Lowe, "Object Recognition from Local Scale-Invariant Features," Proc. IEEE International Conference on Computer Vision, pp. 1150-1157, 1999

Non-Patent Publication 5: J. Sivic and A. Zisserman, "Video google: A text retrieval approach to object matching in videos," Proc. ICCV 2003, Vol. 2, pp. 1470-1477, 2003

Non-Patent Publication 6: G Csurka, C. Bray, C. Dance, and L. Fan, "Visual categorization with bags of keypoints," Proc. ECCV Workshop on Statistical Learning in Computer Vision, pp. 1-22, 2004

SUMMARY OF THE INVENTION

Problem to be Solved by the Invention

However, the conventional Internet browsing can track information about an object of interest only if a link is preliminarily pasted. As a result, it is necessary to use a network search engine. However, a user is required to set a search keyword (text characters) by herself/himself, so that it is often the case that an adequate keyword is not selected for a matter of interest. In other words, there is a fundamental problem, which information that a user really wants cannot be reliably obtained.

The aforementioned map information providing service can provide high overhead-viewability and mobility as compared to services for providing two-dimensional map images. However, an image viewed by a user through a display screen of a terminal device is no more than a two-dimensionally pasted image, so that a sense of reality is restricted by a resolution of the image data. This means that an image to be obtained by maximally enlarging a map image at which the user is looking is a matrix of coarse pixels.

Moreover, this technique lacks a concept of time-axis shifting with respect to model data, and thereby has limits in terms of spatiotemporal shifting.

It is therefore an object of the present invention to provide an image display system capable of allowing a user to browse an image delivered from a system as if the user picks up and move an object of interest in the image by hand, or to enter inside a specific object placed in an image, or capable of performing time-axis shifting for an object placed in an image.

A spatiotemporal space sought by the inventors will be described here.

We, human beings, live in a cognitive space.

As to various human-perceptible information (photograph, moving image, sound, etc.), even if a target object itself does not have sufficiently detailed information, the human brain performs knowledge processing based on accumulated knowledge and experiences to instantaneously complement the insufficient information, so that it becomes possible to accurately judge what the target object is.

The present invention provides a method for applying such a human's characteristic to a computer. Knowledge database of an individual human being is limited to an amount storable in his/her brain. Further, even through knowledge of the entire human race (e.g., knowledge of 7 billion people on the earth+ the entire human race in the past) is much greater, it is unable to refer to it immediately and comprehensively so as to make an accurate judgment.

Such knowledge can be accumulated as a huge database on a computer system over time, and evolved by learning (AI).

Through this activity, creation of an artificial intelligence system having cognitive ability/judging ability far exceeding those of human beings can be expected in the future. Time-axis information may be incorporated in the above basic database. This makes it possible to refer to and move a four-dimensional spatiotemporal space.

The fundamental database will hereinafter be referred to as "mother database" (hereinafter abbreviated as "MDB").

When our everyday environment is carefully observed, things in a broad range of ages and in a broad range of areas have become able to be looked and learned by advanced information distribution. However, there are always the limits of information density due to resolution of an information material and a poor state of object preservation. A world sought by the inventors is "the object", "the space" and "the world", each having an information value exceeding that acquirable by human's five senses and knowledge. These are created by describing details of the real world, and are totally and essentially different from a quasi-real world such as metaverse and virtual world.

In a museum, various things are collected in the form of actual things, whereas the above system is designed to accumulate and develop them in the form of a "mother database" on an AI system capable of recognizing/re-creating them at any timing.

Even assuming that many objects will disappear in one thousand years later, they will survive in the "mother database" on the AI system. In addition to mining geological strata and performing age determination through an isotope measurement, future archaeology will be carried out by mining the mother database. In this sense, the mother database is the most important memory and heritage of the human race.

Means for Solving the Problem

The present invention provides an image display system which has a mother database (MDB) reconfigured from a database for configuring an object, wherein an image (a two-dimensional image, a three-dimensional space or a four-dimensional space) based on the MDB, in an entire image, is substituted for an object subjected to the object recognition based on the MDB, and synthetically displayed.

Preferably, in the image display system of the present invention, the substituted image of the specific object is arranged on a coordinate system different from that of the entire image, and displayed in a rotatable, enlargeable and reduceable manner.

Preferably, the image display system of the present invention is operable, based on detailed information included in the substituted image of the specific object and detailed information obtained from a referable link destination, to allow for enlargement and reduction of an object with detailed data far greater than an amount of initial information included in an input image, and a wide range of browse including an internal structure.

Preferably, the image display system of the present invention is operable to allow for browsing a state of the entire image and/or each specific object, at an arbitrary time, by utilizing time-axis information included in the substituted image of the specific object.

More preferably, the above image display system is operable to explicitly indicate an object which is absent at a specific time, by non-display and/or at least one of a character, a symbol, and a specific color or pattern each representing a non-display state.

Effect of the Invention

The image display system of the present invention has the following advantageous effects.

(1) A detailed image (e.g., three-dimensional model image) subjected to rendering based on a database is substituted for a recognized object, so that it becomes possible to change a point of view of the recognized object, and display the object in an enlargeable and reduceable manner. In addition, when the object has an internal structure (e.g., building data), the inside of the object can be rendered to allow a point of view to enter the internal structure.

(2) In the case where the recognized object includes time-axis information (e.g., it has CAD data of the same type of automobile on a model year-by-model year basis, or it has CAD data for buildings having temporal information, such as order of construction, or construction year), it becomes possible to perform spatiotemporal shifting of a town created in a virtual space. Specifically, it becomes possible to allow a user to browse different appearances of an object, and browse appearances of a group of objects in more wide area, at different times (e.g., replicate an ancient landscape of a town).

BRIEF DESCRIPTION OF THE DRAWINGS

FIG. 5 is an explanatory diagram illustrating an example of a display screen of the terminal device in the image display system according to the embodiment.

FIG. 7 is an explanatory diagram illustrating yet an example of the display screen of the terminal device in the image display system according to the embodiment.

FIG. 8 is an explanatory diagram illustrating an example of the display screen of the terminal device in the image display system according to the embodiment.

FIG. 9 is an explanatory diagram illustrating a flow of an object recognition process in the image display system according to the embodiment.

DESCRIPTION OF EMBODIMENTS

The present invention will now be described based on an image display system according to one embodiment thereof.

Figure 1:
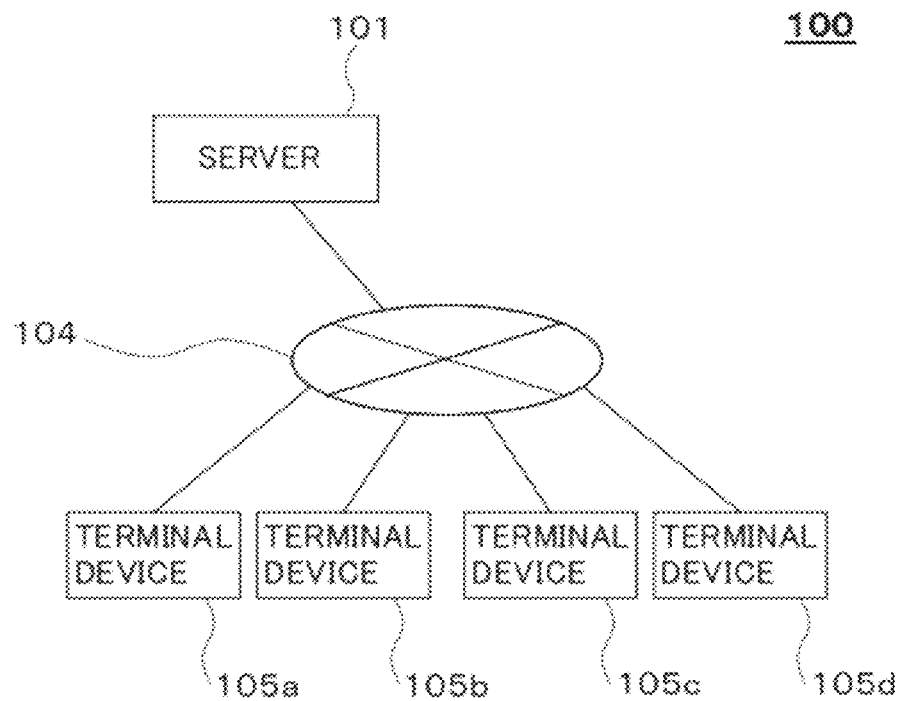
FIG. 1 is an explanatory diagram illustrating a system configuration of an image display system according to one embodiment of the present invention.

FIG. 1 illustrates the image display system according to this embodiment. The image display system 100 comprises a server 101, and a plurality of terminal devices 105a to 105d. Each of the server and the terminal devices is connected to a network 104 such as the Internet.

The server is a computer system for providing a service in response to a request from the terminal device as a client, and means a group of computers which are formed by combining a plurality of server systems. The server is adapted to be driven by a plurality of software programs. Thus, as used in this specification, a meaning of the server is set out as above.

As the most fundamental configuration, a computer as hardware is an electronic computer comprising an arithmetic-logic unit, a control unit, a storage device and an input/output device, which are connected to each other via a command bus and a data bus. The arithmetic-logic unit is operable, based on information (data bits) input from the input/output device through an input/output interface, to perform an arithmetic operation, a logical operation, a comparison operation, a shift operation, etc. Resulting data is stored in the storage device according to need, and then output from the input/output device. The series of processing is controlled by a software program stored in the storage device. Each server machine in the present invention is also hardware at least having the above fundamental functions as a computer, and controlled by an operating system, a device driver, and a group of programs such as application software.

Figure 2:
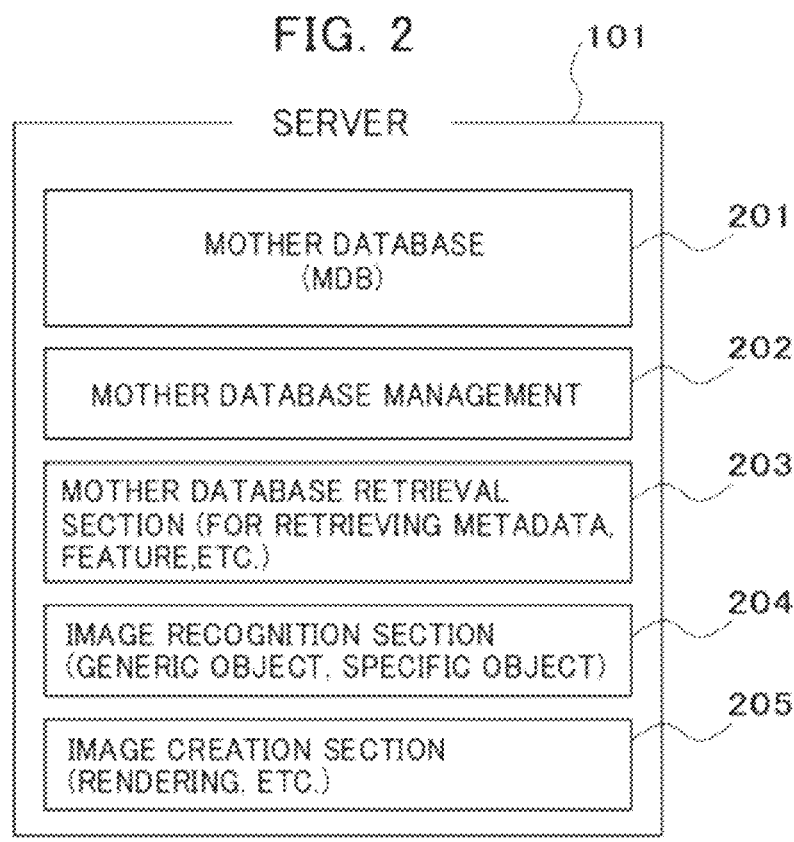
FIG. 2 is an explanatory diagram illustrating functional blocks of a server in the image display system according to the embodiment.

FIG. 2 illustrates functional blocks of the server 101 in the image display system according to this embodiment. The server 101 to be activated on a computer comprises, as software functional blocks: a mother database (hereinafter referred to as "MDB") 201; a mother database management section 202, a mother database retrieval engine 203, an image recognition section 204, and an image creation section 205.

The MDB 201 is a combined database storing therein high-resolution data about objects. For example, the data includes: design data; data about components, machining/treatment, a structure, a shape, raw material information and rigidity information of each object; and supplementary information data such as an object name, a manufacturer information and temporal information (e.g., date); data about a category to which each object belongs; data about a feature value representing a shape of each object, etc.; and vector image data.

The MDB management section 202 is management software for MDB access control, data set control, replication management, leaning management, etc.

The MDB retrieval engine 203 is an engine for retrieving metadata, object feature data, etc., in the MDB.

The image recognition section 204 includes a generic object recognition section for classifying an object by category, and an object recognition section for identifying an object. The generic object recognition section is operable to recognize a generic name (category) of an object included in an image. The object recognition section is operable to perform cross-check with information registered in the MDB to identify an object.

The image creation section 205 is a functional block for performing image creation such as rendering processing. For example, it is operable to perform arithmetic processing necessary for depicting a three-dimensional model on a display screen of each of the terminal devices 105a to 105d. Specifically, the processing includes modeling processing, rendering processing, texture mapping processing and shadow processing for a specific object to be depicted. Such arithmetic processing is performed using a CPU and a memory according to a software program executing each processing algorithm.

According to need, a DSP (Digital Signal Processor) or a GPU (Graphics Processing Unit) for high-speed processing may be used.

Figure 3:
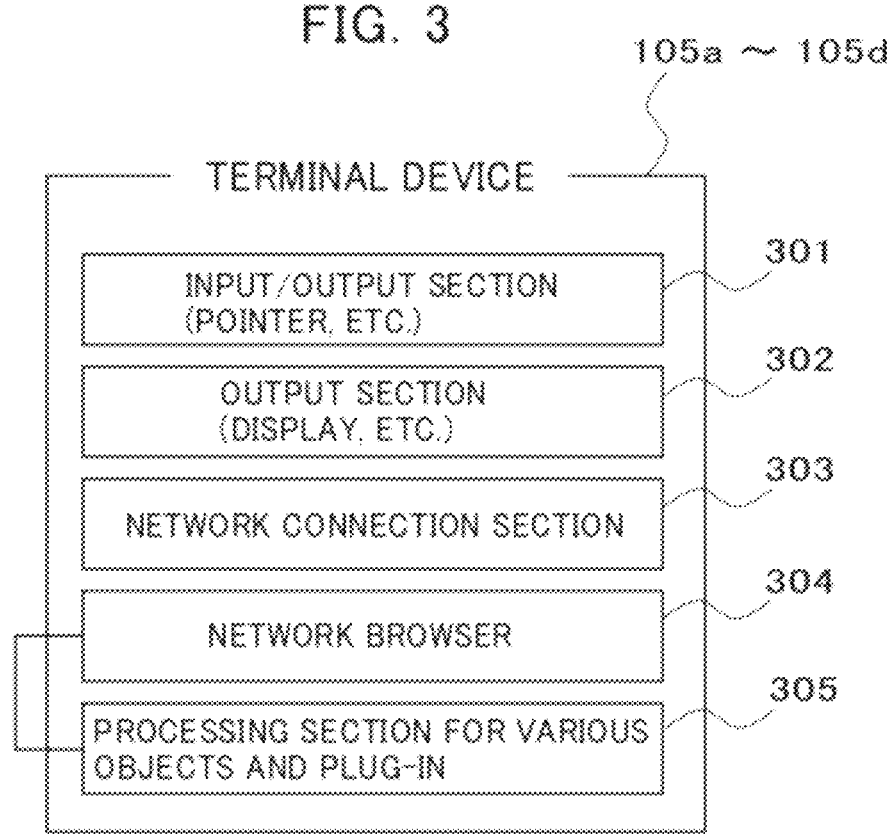
FIG. 3 is an explanatory diagram illustrating functional blocks of a terminal device in the image display system according to the embodiment.

FIG. 3 illustrates the terminal device in the image recognition system according to this embodiment. Each of the terminal devices 105a to 105d is a client terminal device widely used by a user, and includes a computer, a personal digital assistance (PDA) and a mobile phone. This means that FIG. 1 illustrates a state in which various types of a large number of electronic information devices, such as the terminal devices 105a to 105d, are connected to a network such as the Internet. In the following description, the term "terminal device 105" means any one of the terminal devices 105a to 105d connected to the network. Obviously, it is not necessary that all of the terminal devices 105a to 105d are the same type. It is only necessary that they have equivalent functions (or practicable minimum functions). Typical function blocks of the terminal device 105 will be described here.

Each of the terminal devices 105a to 105d comprises: an input/output section 301 composed of a device, such as a keyboard, a pen and/or a mouse; an output section 302 composed of a device, such as a display and/or a speaker; a network connection section 303, a network browser 304; and a processing section 305 for processing various objects and plug-in. Additionally, the terminal device may have a memory section such as a hard disk, a GPU and a voice communication function section.

The network connection section 302 is an interface for connection to a network such as the Internet. It may be a wired type or may be a wireless type.

The network browser 304 is typically application software for browsing a page described by HTML or the like, and includes a wide variety of software for browsing data or information via a network in a comprehensive way. The plug-in processing section 305 is provided in such a manner as to be incorporated in the network browser 304 or to cooperate with the network browser 304, and operable to execute a program provided as an additional function to various objects, such as moving image or high-quality sound, or applications Additionally, for example, a sensor for detecting inclination and acceleration and a GPS receiver may be mounted according to need.

Figure 4:
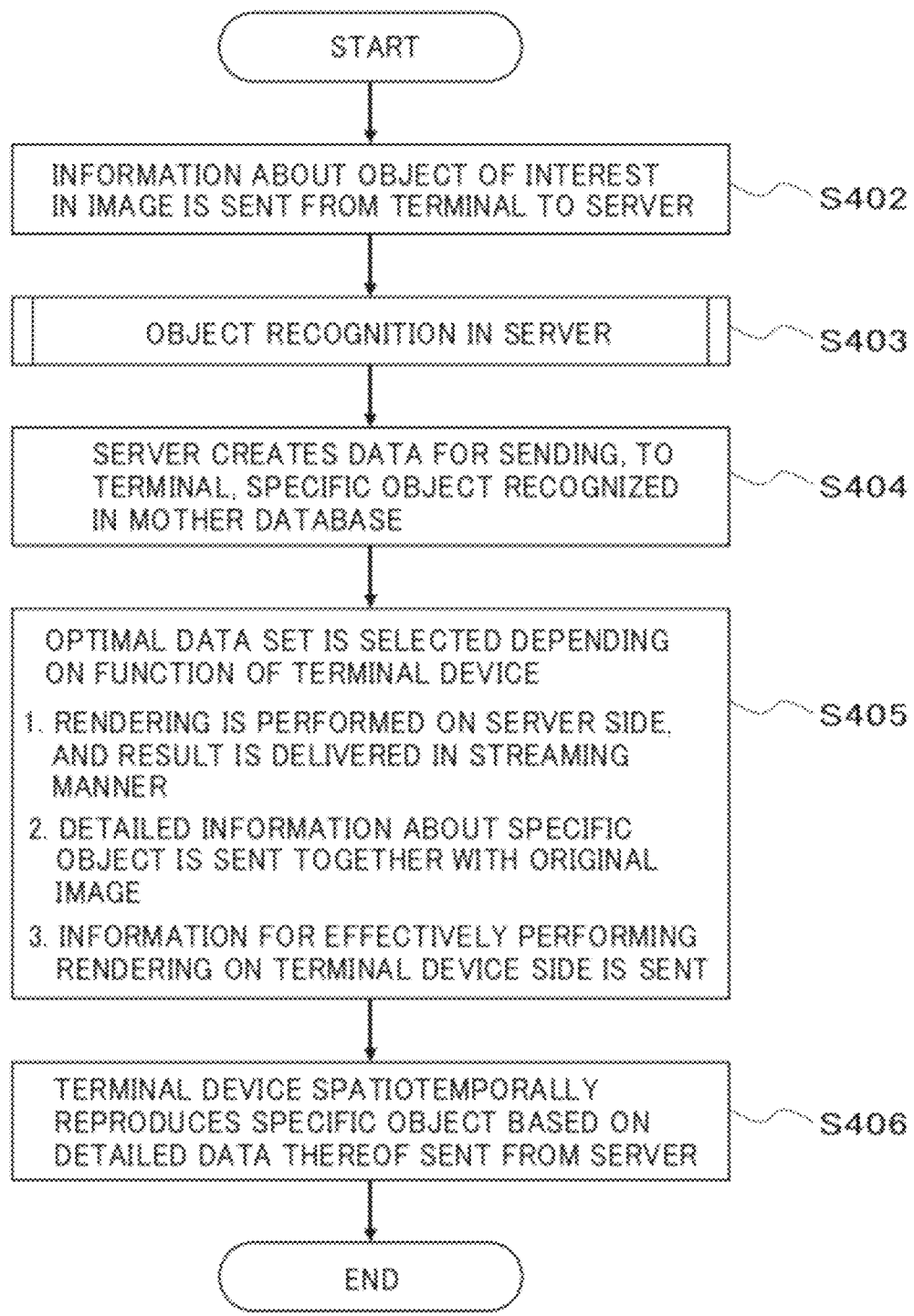
FIG. 4 is an explanatory diagram illustrating an operational flow in the image display system according to the embodiment.

FIG. 4 illustrates an operational flow in the image display system according to the embodiment. In FIG. 4, for example, even in a situation where an object in the display screen has not yet been recognized, an object in an image is identified through an image recognition process. If the object is successfully identified, a three-dimensional image is created from a specific object in the MDB 201, based on a coordinate system and a point of view in the image, and substituted for a detected object in the image. The substituted object can be manipulated to change the point of view, or to be rotated or lifted, as described later. Further, it is possible to refer to future or past detailed data about the substituted object, based on time-axis information. In this operation, a bidirectional communication is performed between the server and the terminal device 105.

First of all, in S402, a user designates an object in a background image. For example, the user places a pointer on an object to be designated, and clicks a mouse or the like to send the image and coordinates of the point to the server 101, so as to clip the object located at the coordinates of the point, on a server side. As information to be sent from the terminal device 105 to the server 101 so as to identify the image, when the image is a still image, an identifier may be used to identify the still image, and when the image is a moving image, an ID capable of identifying a content and frame of the moving image (e.g., an unique ID consisting a moving image ID added with a frame number) may be used.

Then, in S403, the server performs recognition of the designated object. The recognition is performed in order of the generic object recognition and the object recognition. Processing for the recognition will be described later based on FIG. 9. Then, in S404, the server 101 sends data for sending, to the terminal device, a specific object recognized in the MDB 201. In this operation, the server 101 can select an optimal data set depending on a function of the terminal device 105 (S405). For example, there are three options: (1) a rendering processing for a three-dimensional model of an object to be displayed is performed on the server side, and is delivered to the terminal device in a streaming manner; (2) detailed information about the specific object is sent to the terminal device 105 together with the original image; and (3) information for effectively performing rendering on a terminal device side is sent to the terminal device. In S406, based on detailed data about the specific object sent from the server, the terminal device 105 can spatiotemporally reproduce the specific object.

Based on FIGS. 5 to 8, examples of a display screen of the terminal device in the image display system according to this embodiment will be described below.

FIG. 5(A) is an image which is being browsed in the terminal device 105 by a user. The image in FIG. 5(A) includes an automobile 501, a man playing golf 502, a woman 503 walking in a store while pushing a trolley, the Tokyo Tower 504, an automobile 505, and a man 506 riding a bicycle.

In FIG. 5(A), when a user shows an interest in the automobile 505, and selects it through a click operation or the like, an outline of the automobile 505 is clipped as an outline area 510, for example (FIG. 5(B)). The outline area 510 may be highlighted. At this timing, a message indicating that the user gives interest to the automobile 505, is sent from the terminal device 105 to the server 101. Then, in response to receiving the message, the server 101 performs the object recognition process for a region from which the automobile 505 is clipped.

Subsequently, when the automobile 505 is identified through the object recognition process in the aftermentioned manner, the server 101 creates an image conforming to a coordinate system and a size of the automobile 505 included in the image 500, based on CAD data about the automobile 505 registered in the MDB 201, for example. Then, the created image is substituted for the automobile 505 in the image 500. The substituted detailed data can be displayed in a freely rotatable, enlargeable and reduceable manner, according to a user operation In other words, the substituted specific object image of the automobile 505 is arranged in a coordinate system different from that of the entire image (FIG. 5(A)), displayed in a rotatable, enlargeable and reduceable manner, individually.

Figure 6:
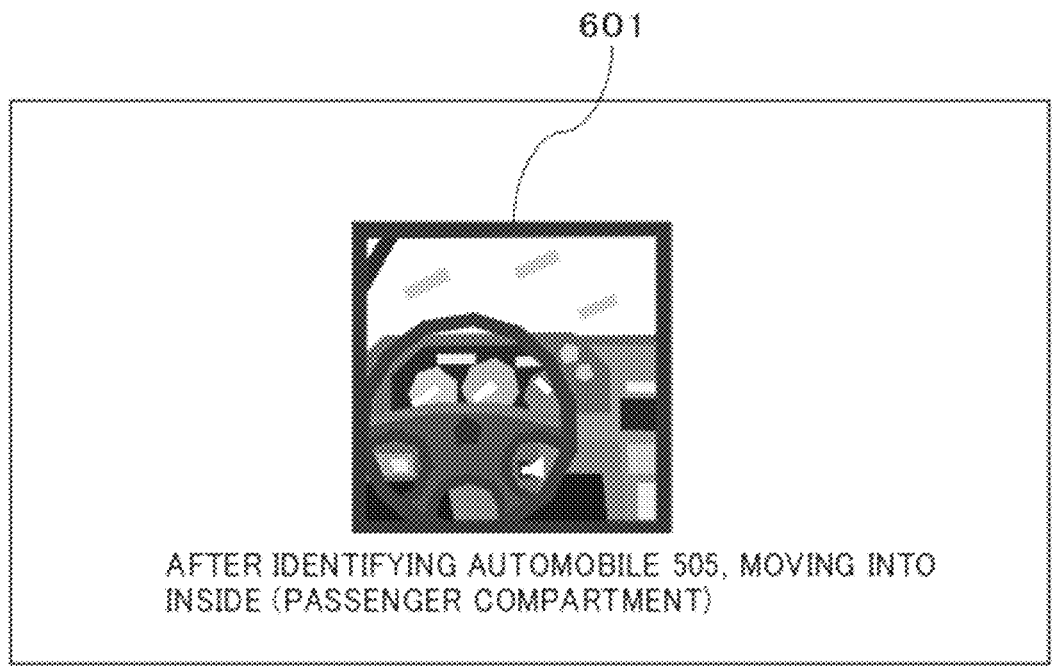
FIG. 6 is an explanatory diagram illustrating an example of the display screen of the terminal device in the image display system according to the embodiment.

Subsequently, in FIG. 5(B), when the user performs an operation for entering inside the automobile 505, the user can visually enter inside the automobile 505, as illustrated in FIG. 6. An automobile interior image 601 is created from CAD data for the automobile 505 registered in the MDB 201. The user can move a point of view in the automobile interior (passenger compartment), and can enlarge/reduce and display various components. Further, if a component (e.g., a steering wheel or a seat) is registered in the MDB 201, it can be arranged on a coordinate system different from the entire image 601, and displayed in a rotatable, enlargeable and reduceable manner, individually. In this case, a sub-window may be opened to display only the component thereon.

FIG. 7 illustrates an example of a space replicating a town suitable for cruising, in the image display system according to this embodiment. FIG. 7(A) is a space three-dimensionally replicating a certain town, wherein a user can visually move close to or away from the town and adjust the altitude up and down, according predetermined operations. For example, design data about a part of an entirety of a plurality of buildings portrayed in FIG. 7(A) are registered in the MDB 201. The following description will be made on the assumption that design data about a part of the buildings are registered in the MDB 201, for the sake of simplicity of explanation.

Then, when buildings having registered design data are displayed according to a predetermined operation, the mark ↓ can be added just above each of the buildings having registered design data, as illustrated in FIG. 7(B). FIG. 7(B) shows that design data about buildings 701, 702, 703, 705, 707 is registered in the MDB 202. Thus, the user can visually move close to each of the buildings, and enter thereinside or move around floors or rooms.

Further, the image screen in FIG. 7(B) has a function of changing time-axis information having the design data. More specifically, a lower region of the image screen in FIG. 7(B) has a slide bar 710 for changing the time-axis information, wherein a time-axis value can be changed by moving a knob 711. In FIG. 7(B), "1980" is displayed on the knob 711, which shows that design data displayed in FIG. 7(B) was created in 1980s. Each of the buildings 704, 706, 708 is displayed as a white space, because design data about the buildings is currently absent although the buildings were already present in 1980. As to the display method, it is possible to utilize a method designed to keep such buildings from being displayed, instead of the display in the form of a while space (non-display method), or a method designed to display an image of a town at that time replicated based on information from historical evidences and others. Further, the non-display and/or a non-display state may be explicitly indicated by a character, a symbol, and/or a specific color or pattern.

Assuming that a situation where an existing building was demolished at a certain time point, when the knob 11 is slidingly moved in a future direction beyond the time point, the demolished building is not displayed any more. On the other hand, in the case where there is design data about a planned building, when the time-axis value is shifted in the future direction beyond a scheduled completion date, the building is displayed.

In other words, time-axis information included in a substituted specific object image is utilized to allow a state of the entire image or each specific object at an arbitrary time to be browsed. If time-axis information is recorded in design data at each stage of construction, a process of construction of a certain building can be browsed by changing the time-axis value on a monthly (or daily) basis.

FIG. 8(A) is an image which is being browsed in the terminal device 105 by another user. The image in FIG. 8(A) includes an automobile 501, a man playing golf 502, a woman 503 walking in a store while pushing a trolley, the Tokyo Tower 504, an automobile 505, and a man 506 riding a bicycle.

In FIG. 8(A), when a user shows an interest in the Tokyo Tower 504, and selects it through a click operation or the like, an outline of the Tokyo Tower 504 is clipped as an outline area 801, for example (FIG. 8(B)). The outline area 801 may be highlighted. At this timing, a message indicating that the user gives interest to the Tokyo Tower 504, is sent from the terminal device 105 to the server 101. Then, in response to receiving the message, the server 101 performs the object recognition process for a region from which the Tokyo Tower 504 is clipped.

Subsequently, when the Tokyo Tower 504 is identified through the object recognition process in the aftermentioned manner, the image can be displayed in a freely rotatable, enlargeable and reduceable manner, according to a user operation. For example, when the user gives instruction for enlargement, an enlarged image of the Tokyo Tower is displayed based on the information in the MDB 202 or detailed information from a referable link destination (802). On the other hand, when the user gives instruction for reduction, a remote image including the Tokyo Tower is displayed based on the information in the MDB 202 or detailed information from a referable link destination, and information about surroundings (803).

In other words, the substituted specific object image of the Tokyo Tower 504 is arranged in a coordinate system different from that of the entire image (FIG. 8(A)), and displayed in an enlargeable and reduceable manner, individually.

Based on FIG. 9, a flow of the object recognition process using the MDB 201 will be described below.

[Generic Object Recognition]

The image recognition process (S901) begins with an input of an original image in the terminal device 105 (S902). The original image may be a two-dimensional image or may be a three-dimensional image. In the operation of inputting the original image, there are a first case where a region of interest including an object of interest in the original image is designated through the use of a device (not illustrated) such as a pointing device, and a second case where the entire original image is input as a target object without designation of a point of interest. Then, in S904, a generic object recognition processing is performed. For example, the BOF (Bag-Of-Features) method may be used in the generic object recognition processing. In this generic object recognition processing, recognition of a category of a detected object (generic name of the object) is performed and then completed. However, in the case where a point of interest is designated, the process is branched depending on whether or not the category is successfully recognized, and the determination is performed in S905. When the recognition of the category fails, the process advances to S906 in which a determination on handling of existing categories is made (S907). However, when the category of the object is successfully recognized irrespective of the presence or absence of the designation of a point of interest, the process advances to S909 to prepare for an object recognition processing.

[Object Recognition]

When the process advances to the object recognition processing according to the determination in S905, a processing of clipping an individual object image is performed in S909. Then, the clipping individual object image is subjected to the object recognition processing (S910). In the object recognition processing, it is tried to identify the object using an evaluation function for calculating a coincidence degree based on the feature value data 253 extracted from the design data registered in the MDB 201.

[Learning Processing (1)]

On the other hand, when the determination in S905 is made that the generic object recognition fails, the process advances to S906 in which, based on an information distance between a feature value of the object of interest and a feature value of each object belonging to existing categories held by the MDB 201, a determination for selecting one of registration of a new category including the object of interest (S907) and study of an extension of an existing category adjacent to the object of interest (S908) is performed. When a new category is registered (S907), the process returns to S904. When an existing category is extended (S908), the process advances to S909.

[Learning Processing (2) After Object Recognition]

In S911, it is determined whether a specific object is successfully identified. When the specific object is successfully identified, the process advances to S913 in which it is determined whether information more detailed than detailed data about the object registered in the MDB 201 is included in the individual object image clipped in S909. If the determination in S913 is made as YES, the process advances to S914 in which detailed data about the object registered in the MDB 201 is updated by the MDB leaning section to allow the MDB 201 to have the more detailed information. On the other hand, when the determination in S913 is made as NO, the process advances to S915 in which the following determination is performed.

After the determination in S905 is made that the generic object recognition fails, according to the determination in S906, the process advances to S908, S909 and S910, and when the specific object is successfully recognized (YES in S911), the determination in S915 is made. When the determination in S915 is made that the identified object falls into an existing category, a definition of the existing category registered in the MDB 201 is extended. Then, when an information distance between objects in the category spreads due to the extension, the existing category is divided into two categories. On the other hand, when an information distance with respect to an adjacent category becomes equal to or less than an information distance between objects in the category, the two categories are integrated. Further, when an inconsistency in existing object information is found during registration of the identified object, it is corrected. Subsequently, the category data is updated (S916). On the other hand, when the determination in S915 is made that the identified object does not fall into an existing category, the process returns to S907 in which it is registered as a new category.

When the determination in S911 is made that the recognition of the specific object fails, this object is registered in the MDB 201 as an "unidentified object" to prepare for future processing. Then, the recognition process is terminated (S917). When the existing category is extended and updated in S916, the recognition process is also terminated (S917).

The learning function of the MDB management section 202 in the above description is appropriately reflected to an operation of the image display system according to this embodiment to enhance a specific object recognition capability.

EXPLANATION OF CODES

100: image display system
101: server
104: network (or Internet)
105a to 105d: terminal device

What is claimed is:

1. An image display system comprising:
  a nontransitory processor-readable storage medium that stores detailed data that includes at least a plurality of temporal information and design data of an object corresponding to the temporal information;
  at least one processor operatively coupled to the nontransitory processor-readable storage medium, the at least one processor:
    receives a certain time and object interest information including information related to an object of interest in an image;
    identifies the object of interest by calculating a coincidence degree between the object interest information and feature value data extracted from the design data; and
    creates a two-dimensional image or a three-dimensional image at the certain time based on a coordinate system and a point of view in the image, and based on the design data of the specified object of interest associated with the temporal information corresponding to the certain time when the design data of the specified object of interest at the certain time is registered in the nontransitory processor-readable storage medium, and creates an unregistered image when the design data of the specified object of interest at the certain time is not registered in the nontransitory processor-readable storage medium, wherein the unregistered image indicates that the design data at the certain time is not registered;
    wherein an image of the specified object of interest in the image at the certain time is substituted for the two-dimensional image or the three dimensional image, or the unregistered image.

2. The image display system as defined in claim 1, wherein the substituted image of the specified object of interest is arranged on a coordinate system different from that of the entire image, and displayed in at least one of a rotatable, enlargeable or reducible manner.

3. The image display system as defined in claim 2, wherein the processor creates the two-dimensional image or the three-dimensional image based on information obtained from a referable link destination.

4. The image display system as defined in claim 3, wherein the certain time is a future time or a past time.

5. The image display system as defined in claim 4, wherein the processor explicitly indicates an object which is absent at a specific time by display of at least one of a character, a symbol, or a specific color or pattern each representing non-display and/or a non-display state.

6. The image display system as defined in claim 3, wherein the certain time is a future time or a past time.

7. The image display system as defined in claim 6, wherein the processor explicitly indicates an object which is absent at a specific time by non-display and/or by display of at least one of a character, a symbol, or a specific color or pattern each representing a non-display state.

8. The image display system as defined in claim 2, wherein the certain time is a future time or a past time.

9. The image display system as defined in claim 8, wherein the processor explicitly indicates an object which is absent at a specific time by non-display and/or by display of at least one of a character, a symbol, or a specific color or pattern each representing a non-display state.

10. The image display system as defined in claim 1, wherein the processor creates the two-dimensional image or the three-dimensional image based on information obtained from a referable link destination.

11. A processor-based device communicatively coupled to a nontransitory processor-readable storage medium that stores detailed data including at least a plurality of temporal information and design data of an object corresponding to the temporal information, the processor-based device comprising:
  a nontransitory processor-readable medium that stores at least one of processor-executable instructions or data; and at least one processor communicatively coupled to the nontransitory processor-readable medium and the nontransitory processor-readable storage medium, the at least one processor:

receives a certain time and object interest information including information related to an object of interest in an image;

identifies the object of interest by calculating a coincidence degree between the object interest information and feature value data extracted from the design data; and creates a two-dimensional image or a three-dimensional image at the certain time based on a coordinate system and a point of view in the image, and based on the design data of the specified object of interest associated with the temporal information corresponding to the certain time when the design data of the specified object of interest at the certain time is registered in the nontransitory processor-readable storage medium, and create an unregistered image when the design data of the specified object of interest at the certain time is not registered in the nontransitory processor-readable storage medium, wherein the unregistered image indicates that the design data at the certain time is not registered;

wherein an image of the specified object of interest in the image at the certain time is substituted for the two-dimensional image or the three dimensional image, or the unregistered image.

12. A computer program product residing on a nontransitory processor-readable medium accessible by at least one processor, the at least one processor communicatively coupled to a nontransitory processor-readable storage medium that stores detailed data including at least a plurality of temporal information and design data of an object corresponding to the temporal information, the computer program product stores at least one of processor-executable instructions or data that cause the at least one processor to:

receive a certain time and object interest information including information related to an object of interest in an image;

identify the object of interest by calculating a coincidence degree between the object interest information and feature value data extracted from the design data; and create a two-dimensional image or a three-dimensional image at the certain time based on a coordinate system and a point of view in the image, and based on the design data of the specified object of interest associated with the temporal information corresponding to the certain time when the design data of the specified object of interest at the certain time is registered in the nontransitory processor-readable storage medium, and create an unregistered image when the design data of the specified object of interest at the certain time is not registered in the nontransitory processor-readable storage medium, wherein the unregistered image indicates that the design data at the certain time is not registered;

wherein an image of the specified object of interest in the image at the certain time is substituted for the two-dimensional image or the three dimensional image, or the unregistered image.

13. A nontransitory processor-readable medium accessible by at least one processor, the at least one processor communicatively coupled to a nontransitory processor-readable storage medium that stores detailed data including at least a plurality of temporal information and design data of an object corresponding to the temporal information, the nontransitory processor-readable medium stores at least one of processor-executable instructions or data that cause the at least one processor to:

receive a certain time and object interest information including information related to an object of interest in an image;

identify the object of interest by calculating a coincidence degree between the object interest information and feature value data extracted from the design data; and create a two-dimensional image or a three-dimensional image at the certain time based on a coordinate system and a point of view in the image, and based on the design data of the specified object of interest associated with the temporal information corresponding to the certain time when the design data of the specified object of interest at the certain time is registered in the nontransitory processor-readable storage medium, and create an unregistered image when the design data of the specified object of interest at the certain time is not registered in the nontransitory processor-readable storage medium, wherein the unregistered image indicates that the design data at the certain time is not registered;

wherein an image of the specified object of interest in the image at the certain time is substituted for the two-dimensional image or the three dimensional image, or the unregistered image.

* * * * *